(12) United States Patent
Nylander et al.

(10) Patent No.: US 9,860,801 B2
(45) Date of Patent: Jan. 2, 2018

(54) METHODS AND APPARATUS FOR MAINTAINING INFORMATION REGARDING THE MOVEMENT OF USER TERMINALS

(71) Applicant: TELEFONAKTIEBOLAGET L M ERICSSON (PUBL), Stockholm (SE)

(72) Inventors: Tomas Nylander, Värmdö (SE); Per-Daniel Stålnacke, Bromma (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 14/439,273

(22) PCT Filed: Oct. 30, 2012

(86) PCT No.: PCT/EP2012/071517
§ 371 (c)(1),
(2) Date: Apr. 29, 2015

(87) PCT Pub. No.: WO2014/067565
PCT Pub. Date: May 8, 2014

(65) Prior Publication Data
US 2015/0304906 A1  Oct. 22, 2015

(51) Int. Cl.
*H04W 36/00* (2009.01)
*H04W 36/14* (2009.01)
*H04W 88/06* (2009.01)
*H04W 36/36* (2009.01)
*H04W 84/12* (2009.01)

(52) U.S. Cl.
CPC ....... *H04W 36/0066* (2013.01); *H04W 36/14* (2013.01); *H04W 36/36* (2013.01); *H04W 88/06* (2013.01); *H04W 84/12* (2013.01)

(58) Field of Classification Search
None
See application file for complete search history.

(56) References Cited

U.S. PATENT DOCUMENTS

| 2004/0146021 A1* | 7/2004 | Fors | H04W 36/0066 370/331 |
|---|---|---|---|
| 2004/0185853 A1* | 9/2004 | Kim | H04W 36/0083 455/438 |
| 2006/0270411 A1* | 11/2006 | Grayson | H04W 36/14 455/444 |
| 2007/0238468 A1* | 10/2007 | Buckley | H04Q 3/0045 455/445 |
| 2008/0049694 A1* | 2/2008 | Kinoshita | H04W 88/06 370/338 |

(Continued)

FOREIGN PATENT DOCUMENTS

WO   2003/061177 A2   7/2003

*Primary Examiner* — Huy D Vu
*Assistant Examiner* — James P Duffy
(74) *Attorney, Agent, or Firm* — Patent Portfolio Builders, PLLC

(57) ABSTRACT

A method of operating a user terminal when attempting to move from one of a cell of a 3GPP network and an AP of a WLAN to the other of a cell of a 3GPP network and an AP of a WLAN, is provided. The method comprises identifying the 3GPP network and the 3GPP cell to the WLAN, and identifying the WLAN and a WLAN AP to the 3GPP network.

13 Claims, 4 Drawing Sheets

(56) References Cited

U.S. PATENT DOCUMENTS

| | | | | |
|---|---|---|---|---|
| 2009/0245202 A1* | 10/2009 | Gras | ................... | H04W 76/041 370/331 |
| 2010/0275249 A1* | 10/2010 | McCann | ................. | H04L 63/08 726/5 |
| 2012/0106370 A1* | 5/2012 | Radulescu | ........ | H04W 36/0083 370/252 |

* cited by examiner

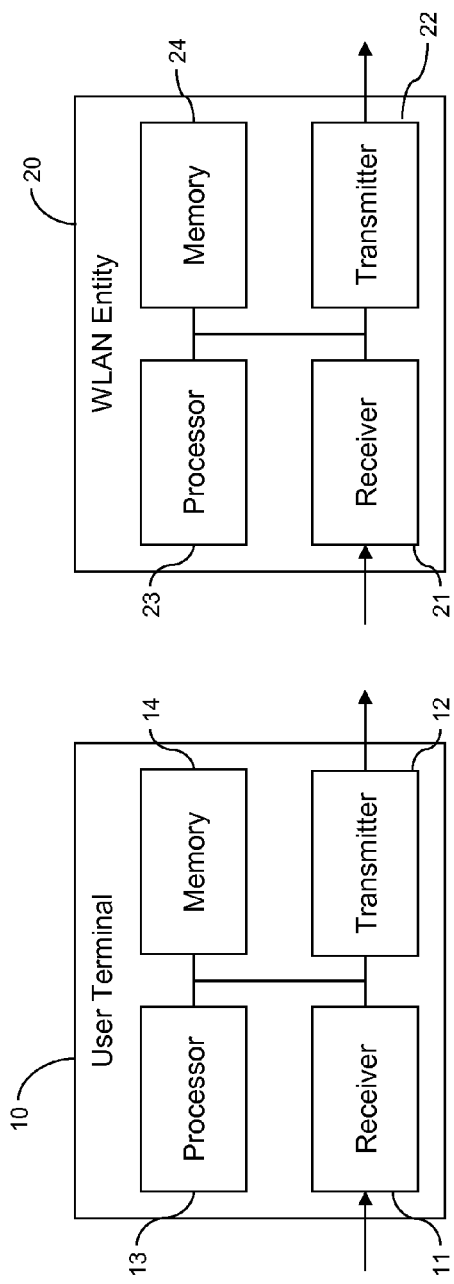
Figure 4
Figure 5
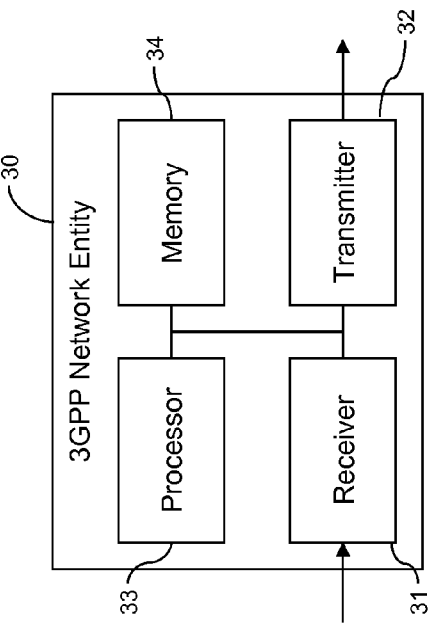
Figure 6

METHODS AND APPARATUS FOR MAINTAINING INFORMATION REGARDING THE MOVEMENT OF USER TERMINALS

This application is a 371 of International Application PCT/EP2012/071517, filed Oct. 30, 2012, the disclosure of which is fully incorporated herein by reference.

TECHNICAL FIELD

The present invention relates to methods and apparatus for maintaining information regarding the movement of user terminals between networks that utilise different radio access technologies (RATs). More particularly, the invention relates to methods and apparatus for maintaining information regarding the movement of user terminals between 3rd Generation Partnership Project (3GPP) networks and Wi-Fi networks.

BACKGROUND

Data traffic in mobile telecommunications networks is continually increasing. Consequently, operators are employing heterogeneous access networks that utilise multiple radio access technologies (RATs) in order to provide greater capacity, particularly in high traffic areas and areas that otherwise have poor network coverage.

Typically, the radio access technologies utilised as part of these heterogeneous access networks include UMTS Radio Access Network (UTRAN) and an Evolved UTRAN (eUTRAN), and Wi-Fi/WLAN RAN. For example, FIG. 1 illustrates schematically a heterogeneous access network comprised of a UTRAN, an eUTRAN, and a Wi-Fi/WLAN RAN. In this regard, both the UTRAN and eUTRAN standards are defined by the 3rd Generation Partnership Project (3GPP), and the relevant 3GPP standards therefore define capabilities for interaction between these 3GPP RANs. In contrast, the Wi-Fi/WLAN standards are defined by the Institute of Electrical and Electronics Engineers (IEEE), and neither the IEEE standards nor the 3GPP standards define capabilities for interaction between a Wi-Fi/WLAN network and a 3GPP network. Furthermore, as a WLAN network and a 3GPP network are part of separate domains that use different management systems, different paradigms, different identities etc., there is no mechanism that allows either network to determine information relating to the other network.

Consequently, for a device/user terminal (i.e. user equipment (UE), station (STA) etc) that is both 3GPP and WiFi/WLAN capable, and can therefore move between a 3GPP network and a WLAN, the decision to move between a 3GPP network and a WLAN will be made by the user terminal. For example, for most currently available user terminals, when the user terminal is within the coverage of both a WLAN and a 3GPP network, the user terminal will automatically attempt to connect to the WLAN and will detach from the 3GPP network. As a further example, a user terminal could decide to attempt to associate with a WLAN if the connection to a 3GPP network is poor. In such circumstances, neither the 3GPP network nor the WLAN will have any knowledge of each other, and it will therefore appear to the serving/source network (i.e. the network from which the user terminal is moving) as if the user terminal is merely disconnecting, whilst the user terminal has in fact moved to an alternative network.

It has been recognised here that one issue that arises from the fact that movement between a WLAN and a 3GPP network is determined by the user terminal, and the lack of knowledge within the networks regarding such movement, is that it is then very difficult to troubleshoot any problems, faults or errors that occur. For example, consider a scenario in which a user terminal is using a connection to a 3GPP network to obtain a streamed video when the user terminal then decides to move to a WLAN, yet subsequently receives poor performance from the WLAN that causes the video to freeze frequently. If the user of the user terminal contacts customer care of their mobile operator regarding this issue, the mobile operator will only be able to determine that the user terminal disconnected from the 3GPP network and will not be able to ascertain any further information in order to determine the actual cause of the issue. In particular, the mobile operator will have no knowledge that the issue was caused by a move to another network that resulted in a change in the radio access technology.

In addition, due to the increasing availability of heterogeneous radio access networks, mechanisms for providing access selection and traffic steering between the different radio access technologies is being considered. When this functionality becomes available, the ability to observe the movement of user terminals between the radio access technologies will then be particularly important, e.g. in order to determine the effect of configuration changes.

SUMMARY

It is therefore an object of the present invention to provide methods and apparatus for maintaining information regarding the movement of user terminals between 3GPP networks and WLANs.

According to a first aspect there is provided a method of operating a user terminal when attempting to move from one of a cell of a 3GPP network and an AP of a WLAN to the other of a cell of a 3GPP network and an AP of a WLAN. The method comprises identifying the 3GPP network and the 3GPP cell to the WLAN, and identifying the WLAN and a WLAN AP to the 3GPP network.

If the user terminal is attempting to move from a cell of a 3GPP network to an AP of a WLAN, then the method may further comprise, when attempting to associate with the WLAN, sending information identifying the 3GPP network and the 3GPP cell to the WLAN, and obtaining information identifying the WLAN and the WLAN AP. Then, when disconnecting from the 3GPP cell, the method comprises sending the information identifying the WLAN and the WLAN AP to the 3GPP network.

The method may further comprise receiving a message from the 3GPP network, the message indicating that when the user terminal is attempting to move to or from a further network, the user terminal should provide identification information identifying the further network to the 3GPP network. Alternatively, or in addition, the method may further comprise receiving a message from the WLAN, the message indicating that when the user terminal is attempting to move to or from a further network, the user terminal should provide identification information identifying the further network to the WLAN.

If the user terminal is attempting to move from an AP of a WLAN to a cell of a 3GPP network, then the method may further comprise, when initiating a connection to the 3GPP network, sending information identifying the WLAN and the WLAN AP to the 3GPP network, and obtaining information identifying the 3GPP network and the 3GPP cell. Then, when disconnecting from the WLAN, the method comprises sending the obtained information identifying the 3GPP network and the 3GPP cell to the WLAN.

The method may further comprise receiving a message from the WLAN, the message indicating that when the user terminal is attempting to move to or from a further network, the user terminal should provide identification information identifying the further network to the WLAN. Alternatively, or in addition, the method may further comprise receiving a message from the 3GPP network, the message indicating that when the user terminal is attempting to move to or from a further network, the user terminal should provide identification information identifying the further network to the 3GPP network.

The information identifying the 3GPP network and the 3GPP cell can comprise a Cell Global Identity (CGI) of the 3GPP cell. Alternatively, the information identifying the 3GPP network and the 3GPP cell may comprise a Routing Area Identification (RAI) and a cell identity (CI).

The information identifying the WLAN can comprise a Service Set Identifier (SSID). Optionally, the information identifying the WLAN can further comprises a Homogeneous Extended Service Set Identifier (HESSID). The information identifying the WLAN AP can comprise a Basic Service Set Identifier (BSSID).

According to a second aspect there is provided a method of operating an entity of a WLAN. The method comprises, during an attempt by a user terminal to associate with the WLAN, receiving information identifying a 3GPP network and a cell of the 3GPP network to which the user terminal is currently attached, and causing storage of the information identifying the 3GPP network and the 3GPP cell in the WLAN together with information about the association. Alternatively, or in addition, the method comprises, during a disassociation of a user terminal that is associated with the WLAN, receiving information identifying a 3GPP network and a cell of the 3GPP network to which the user terminal has attached, and causing storage of the information identifying the 3GPP network and the 3GPP cell in the WLAN together with information about the disassociation.

The method may further comprise sending a message to the user terminal, the message indicating that when the user terminal is attempting to move to or from a further network, the user terminal should provide identification information identifying the further network to the WLAN.

According to a third aspect there is provided a method of operating an entity of a 3GPP network. The method comprises, during an attempt by a user terminal to attach to the 3GPP network, receiving information identifying a WLAN and an AP of the WLAN with which the user terminal is currently associated, and causing storage of the information identifying the WLAN and the WLAN AP in the 3GPP network together with information about the attachment. Alternatively, or in addition, the method comprises, during detachment of a user terminal that is attached to the 3GPP network, receiving information identifying a WLAN and an AP of the WLAN with which the user terminal is currently associated, and causing storage of the information identifying the WLAN and the WLAN AP in the 3GPP network together with information about the detachment.

The method may further comprise sending a message to the user terminal, the message indicating that when the user terminal is attempting to move to or from a further network, the user terminal should provide identification information identifying the further network to the 3GPP network.

BRIEF DESCRIPTION OF THE DRAWINGS

Some embodiments of the present invention will now be described in detail with reference to the accompanying drawings, in which:

FIG. 4 illustrates schematically an embodiment of a user terminal configured to implement the methods described herein;

FIG. 5 illustrates schematically an embodiment of an entity of a WLAN configured to implement the methods described herein;

FIG. 6 illustrates schematically an embodiment of an entity of a 3GPP network configured to implement the methods described herein.

DETAILED DESCRIPTION

Figure 1:
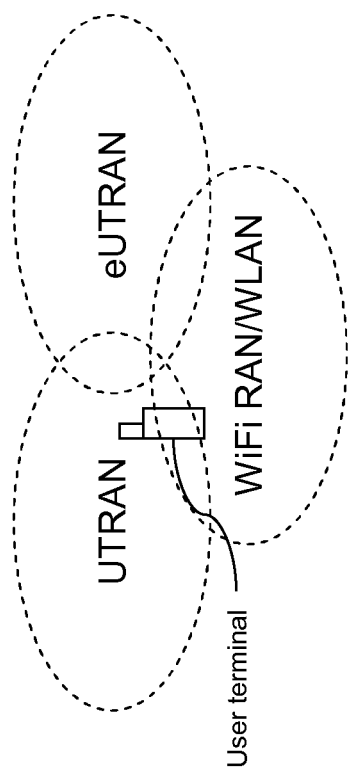
FIG. 1 illustrates schematically an example of a heterogeneous access network.

In order to at least mitigate the problems identified above there will now be described methods and apparatus for enabling the maintenance of information regarding the movement of user terminals between 3GPP networks and WLANs. These methods involve configuring a user terminal such that, when the user terminal attempts to move from one of a cell of a 3GPP network and an Access Point (AP) of a WLAN to the other of a cell of a 3GPP network and an AP of a WLAN, the user terminal identifies the 3GPP network and the 3GPP cell to the WLAN, and identifies the WLAN and the WLAN AP to the 3GPP network. The networks can there store this information in order to track the movement of the user terminal between the networks.

Therefore, if the user terminal attempts to move from a cell of a 3GPP network to an AP of a WLAN, the user terminal sends information identifying the 3GPP network and the 3GPP cell to the WLAN. The user terminal also obtains information identifying the WLAN and the WLAN AP, and sends the information identifying the WLAN and the WLAN AP to the 3GPP network. In particular, when attempting to associate with the WLAN, the user terminal sends information identifying the 3GPP network and the 3GPP cell to which the user terminal is currently attached. The user terminal also obtains information identifying the WLAN and the WLAN AP with which the user terminal is attempting to associate, and sends the information identifying the WLAN and the WLAN AP to the 3GPP network when disconnecting from the 3GPP cell.

Conversely, if the user terminal attempts to move from an AP of a WLAN to a cell of a 3GPP network, the user terminal sends information identifying the WLAN and the WLAN AP to the 3GPP network, obtains information identifying the 3GPP network and the 3GPP cell, and sends information identifying the 3GPP network and the 3GPP cell to the WLAN. In particular, when attempting to initiate a connection to the 3GPP network, the user terminal sends information identifying the WLAN and the WLAN AP with which the user terminal is currently associated. The user terminal also obtains information identifying the 3GPP network and the 3GPP cell to which the user terminal is attempting to connect, and sends the information identifying the 3GPP network and the 3GPP cell to the WLAN when disassociating from the WLAN.

These methods also involve configuring an entity of a WLAN such that, when a user terminal attempts to associate with the WLAN, the entity can receive information identifying a 3GPP network and a cell of the 3GPP network to which the user terminal is currently attached and, upon receiving such information, can cause storage of the information identifying the 3GPP network and the 3GPP cell in the WLAN together with information about the association. Alternatively, or in addition, the entity can be configured such that, when a user terminal attempts to disassociate from the WLAN, the entity can receive information identifying a 3GPP network and a cell of the 3GPP network to which the user terminal has attached and, upon receiving such information, can cause storage of the information identifying the 3GPP network and the 3GPP cell in the WLAN together with information about the disassociation.

By way of example, the WLAN network entity could be an Access Point (AP) of the WLAN, an Access Controller (AC) of the WLAN network, or an entity within the management system etc.

In addition, these methods involve configuring an entity of a 3GPP network such that, when a user terminal attempts to attach to the 3GPP network, the entity can receive information identifying a WLAN and an AP of the WLAN with which the user terminal is currently associated and, upon receiving such information, can cause storage of the information identifying the WLAN and the WLAN AP in the 3GPP network together with information about the attachment. Alternatively, or in addition, the entity can be configured such that, when a user terminal attempts to detach from the 3GPP network, the entity can receive information identifying a WLAN and an AP of the WLAN with which the user terminal is currently associated and, upon receiving such information, can cause storage of the information identifying the WLAN and the WLAN AP in the 3GPP network together with information about the detachment. By way of example, the 3GPP network entity could be a node within the RAN of the 3GPP network or could be a node within the core network (CN) of the 3GPP network. Expanding upon these examples, the 3GPP network entity could be any of a base station, a Node B, an eNode B, and a radio network controller (RNC) within the RAN of the 3GPP network, or could be any of a Serving GPRS Support Node (SGSN) and a Mobility Management Entity (MME) within the CN of the 3GPP network.

By way of example, the information identifying the 3GPP network and the 3GPP cell could comprise a Global System for Mobile Communications (GSM) Cell Global Identity (CGI), wherein the CGI is composed of the Mobile Country Code (MCC), the Mobile Network Code (MNC), the Location Area Code (LAC), and the Cell Identity (CI). The MCC identifies the country in which a GSM Public Land Mobile Network (PLMN) is located, whilst the MNC is a code identifying the GSM PLMN within that country. The LAC identifies a location area within the GSM PLMN, and the CI uniquely identifies the cell within that location area. As an alternative example, the information identifying the 3GPP network and the 3GPP cell could comprise a Long Term Evolution (LTE) E-UTRAN Cell Global Identifier (E-CGI), wherein the E-CGI is composed of an identity of the PLMN that the cell belongs to and the Cell Identity (CI) of the cell. As a further example, the information identifying the 3GPP network could comprise a Routing Area Identification (RAI) which includes a Location Area Identity (LAI), wherein the LAI includes the MCC and MNC that identify the PLMN. The information identifying the 3GPP cell is then the Cell Identity (CI) which in Wideband Code Division Multiple Access (WCDMA) would then comprise a Radio Network Controller (RNC) ID and a Cell ID that uniquely identifies the cell within the radio network subsystem. Of course, any other suitable identifier(s) could be used, such as the Base Station Identity Code (BSIC) etc.

By way of example, the information identifying the WLAN could comprise a service set identifier (SSID) that is the WLAN radio access identifier. As a further example, the information identifying the WLAN could comprise a SSID together with a Homogeneous Extended Service Set ID (HESSID), wherein the HESSID is a globally unique network identifier that it is normally set to the MAC address of one of the APs of the network. Coupled together, the HESSID and the SSID provide a unique identifier for a WLAN access network. If the HESSID parameter is not available, then the SSID is used only. The information identifying the WLAN AP could comprise a basic service set identifier (BSSID), wherein the BSSID is the Media Access Control (MAC) address of the WLAN AP. Of course, any other suitable identifier(s) could be used.

Figure 2:
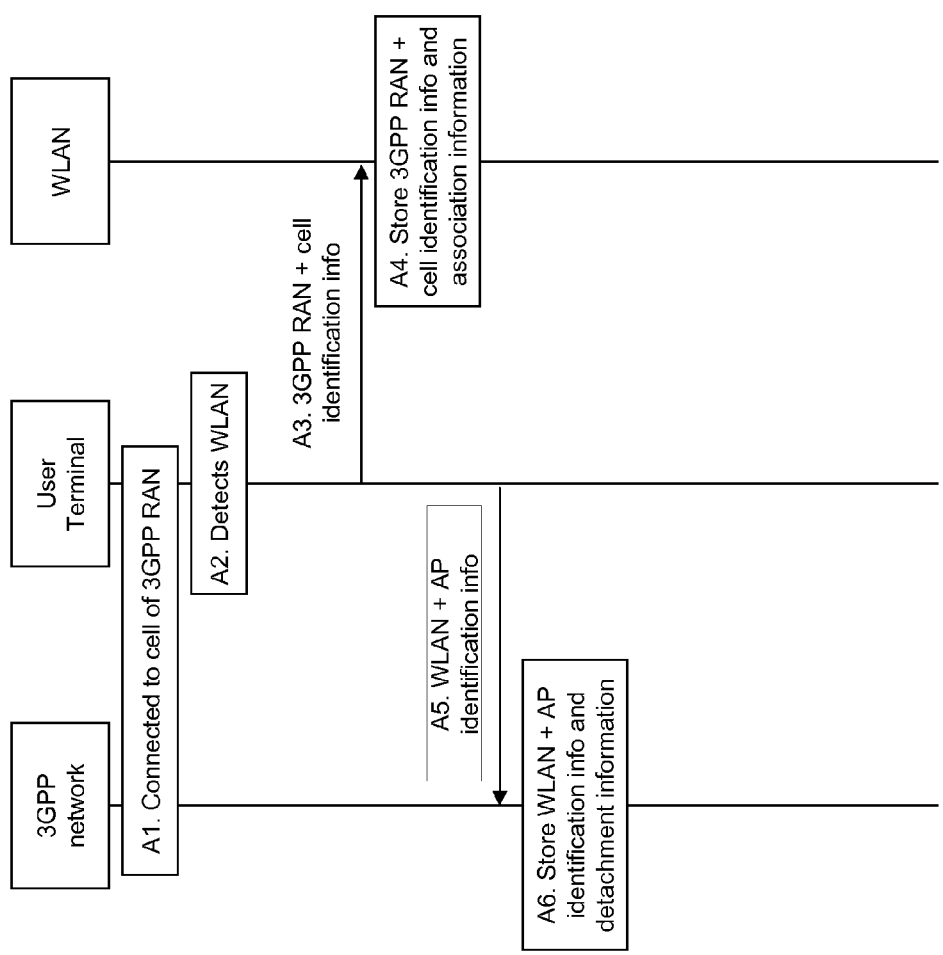
FIG. 2 is a signalling flow diagram illustrating an example of a user terminal attempting to move from a 3GPP network to a WLAN in accordance with the methods described herein.

FIG. 2 is a signalling flow diagram illustrating a user terminal attempting to move from a 3GPP network to a WLAN in accordance with the methods described herein. The steps performed are as follows:

A1. The user terminal is initially attached to a cell of the 3GPP network.

A2. The user terminal detects an AP of a WLAN and decides to move from the 3GPP network to the WLAN.

A3. When attempting to associate with the WLAN, the user terminal generates and sends a frame/message to the WLAN that includes information identifying the 3GPP network and the 3GPP cell to which the user terminal is currently attached.

A4. The frame/message is received by the WLAN, which then stores the information identifying the 3GPP network and the 3GPP cell together with information regarding the attempted association. For example, the information regarding the association could include the time of the attempted association, an indication of the success or failure of the attempted association, an identity of the user terminal, an identity of the user of the user terminal, etc A5. If the attempt to associate with the WLAN is successful, the user terminal will then detach from the 3GPP network. When detaching from the 3GPP network, the user terminal generates and sends a message to the 3GPP network that includes information identifying the WLAN and the WLAN AP with which the user terminal is now associated.

A6. The message is received in the 3GPP network, which then stores the information identifying the WLAN and the WLAN AP together with information regarding the detachment. For example, the information regarding the detachment could include the time of the detachment, an identity of the user terminal, an identity of the user of the user terminal, etc The step of sending information identifying the 3GPP network and the 3GPP cell to the WLAN during an attempt to associate with the WLAN can comprise generating an association request frame that includes information identifying the 3GPP network and the 3GPP cell, and sending the association request frame to the WLAN. As an alternative example, this step could comprise generating an authentication frame that includes information identifying the 3GPP network and the 3GPP cell, and sending the authentication frame to the WLAN. As a further example, the information identifying the 3GPP network and the 3GPP cell could be sent to the WLAN in a new frame/message. In particular, the user terminal could generate an association request frame that includes an indication that a further frame is to be sent, and could send the association request frame to the WLAN. The user terminal could then generate a further frame that includes information identifying the 3GPP network and the 3GPP cell, and send this further frame to the WLAN. Alternatively, the WLAN protocol could be revised so as to provide for such a new frame/message, such that the protocol version would indicate that a further frame is to be sent. In this case, after sending an association request frame to the WLAN, the user terminal could generate a further frame that includes information identifying the 3GPP network and the 3GPP cell, and send the further frame to the WLAN.

In addition, the step of sending information identifying the WLAN and the WLAN AP to the 3GPP network during the detachment from the 3GPP network can optionally comprise generating a detach request that includes information identifying the WLAN and the WLAN AP, and sending the detach request to the 3GPP network. As a further example, the information identifying the WLAN and the WLAN AP could be sent to the 3GPP network in a new message. In particular, the user terminal could generate a detach message that includes an indication that a further message is to be sent, and could send the detach message to the 3GPP network. The user terminal could then generate a further message that includes information identifying the WLAN and the WLAN AP, and send this further message to the 3GPP network. In this regard, such messages could be sent to the 3GPP network as part of the Mobility Management (MM) layer procedures that occur at the Non-Access Stratum (NAS) layer between the user terminal and the 3GPP core network. Therefore, if it is preferable that the identification information is sent directly to the 3GPP RAN, then this information identifying the WLAN and the WLAN AP could be included in a Radio Resource Control (RRC) message that is sent to the 3GPP RAN by the user terminal. In particular, the information identifying the WLAN and the WLAN AP could be included in a new RRC message that is intended to carry this identification information. The user terminal could therefore be configured to send a new RRC message to the 3GPP RAN including information identifying the WLAN and the WLAN AP, prior to releasing the RRC connection to the 3GPP RAN.

Optionally, the method could also include a step of configuring the user terminal to provide information regarding the movement of the user terminal between networks.

In this regard, one or both of the WLAN and the 3GPP network could be configured to send a frame/message to the user terminal (e.g. during the establishment of an association/connection), the frame/message indicating that the user terminal should provide network identification information should the user terminal attempt to move between networks. For example, when an RRC connection with the 3GPP RAN is established, the 3GPP RAN could be configured to send a RRC Connection Reconfiguration message to the user terminal including an indication that the user terminal should notify the 3GPP RAN when the user terminal attempts to move between different RANs. The 3GPP RAN would thereby instruct/configure the user terminal to send a notification when the user terminal attempts to move from the 3GPP network to another network, the notification including information about the target/destination network (e.g. identifying a WLAN and a WLAN AP). Then, when the user terminal subsequently attempts to attach to a WLAN, the user terminal would send a new RRC message to the 3GPP RAN including information identifying the WLAN and the WLAN AP, prior to releasing the RRC connection to the 3GPP RAN, in accordance with the instructions from the 3GPP RAN.

Figure 3:
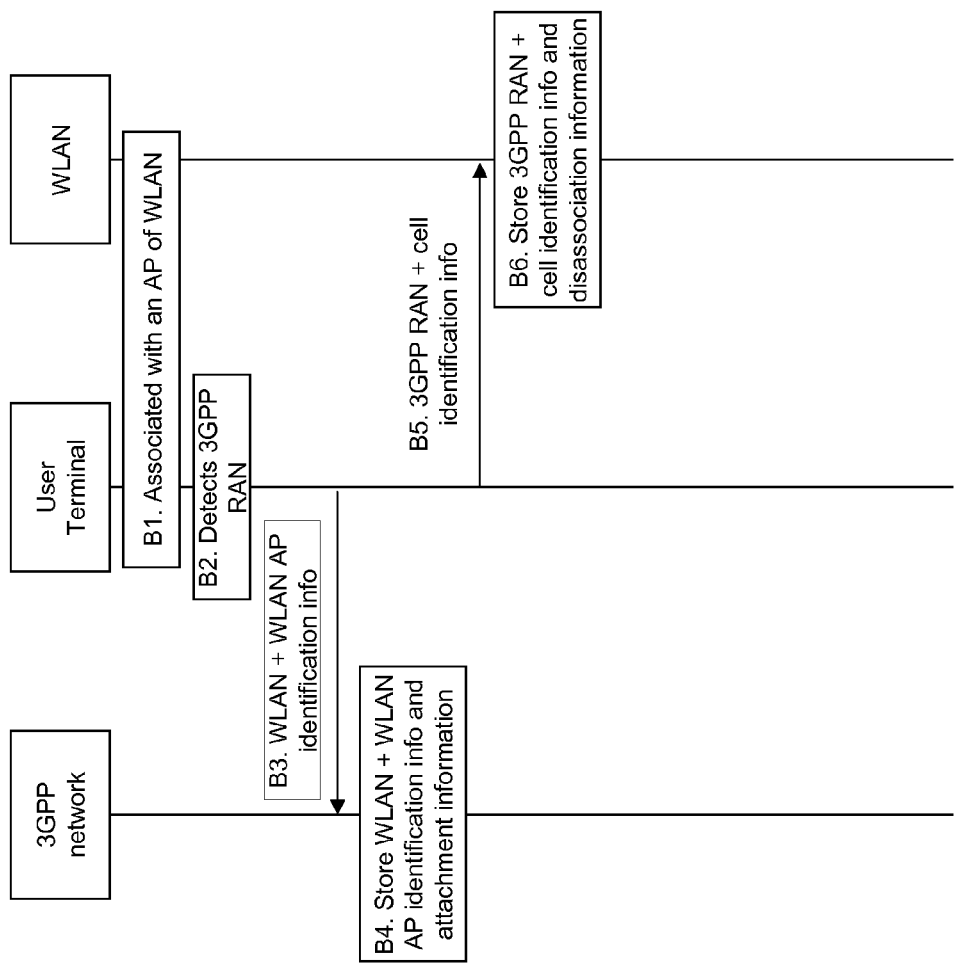
FIG. 3 is a signalling flow diagram illustrating an example of a user terminal attempting to move from a WLAN to a 3GPP network in accordance with the methods described herein.

FIG. 3 is a signalling flow diagram illustrating a user terminal attempting to move from a WLAN to a 3GPP network in accordance with the methods described herein. The steps performed are as follows:

B1. The user terminal is initially associated with an AP of a WLAN.

B2. The user terminal detects a cell of the 3GPP network and decides to move from the WLAN to the 3GPP network.

B3. When attempting to attach to the 3GPP network, the user terminal generates and sends a message to the 3GPP network that includes information identifying the WLAN and the WLAN AP with which the user terminal is currently associated.

B4. The message is received in the 3GPP network, which then stores the information identifying the WLAN and the WLAN AP together with information regarding the attempted attachment. For example, the information regarding the attempted attachment could include the time of the attempted attachment, an indication of the success or failure of the attempted attachment, an identity of the user terminal, an identity of the user of the user terminal, etc B5. If the attempt to attach to the 3GPP network is successful, the user terminal will then disassociate from the WLAN. When disassociating from the WLAN, the user terminal generates and sends a frame/message to the WLAN that includes information identifying the 3GPP network and the 3GPP cell to which the user terminal is now attached.

B6. The frame/message is received in the WLAN, which then stores the information identifying the 3GPP network and the 3GPP cell together with information regarding the disassociation. For example, the information regarding the disassociation could include the time of the disassociation, an identity of the user terminal, an identity of the user of the user terminal, etc The step of sending information identifying the WLAN and the WLAN AP to the 3GPP network could comprise generating an attach request message that includes information identifying the WLAN and the WLAN AP, and sending the attach request message to the 3GPP network. As an alternative example, the information identifying the WLAN and the WLAN AP could be sent to the 3GPP network in a new message. In particular, the user terminal could generate an attach request message that includes an indication that a further message is to be sent, and could send the attach request message to the 3GPP network. The user terminal could then generate a further message that includes information identifying the WLAN and the WLAN AP, and send this further message to the 3GPP network. However, such messages could be sent as part of the Mobility Management (MM) layer procedures that occur at the Non-Access Stratum (NAS) layer between the user terminal and the 3GPP core network. Therefore, if it is preferable that the identification information is sent directly to the 3GPP RAN, then this information identifying the WLAN and the WLAN AP could be included in a Radio Resource Control (RRC) message that is sent to the 3GPP RAN by the user terminal. For example, the information identifying the WLAN and the WLAN AP could be included in an existing RRC message, such as the RRC Connection Request or RRC Connection Setup Complete messages, or could be sent in a new RRC message that is intended to carry this identification information. The user terminal could therefore be configured to send a RRC message to the 3GPP RAN including information identifying the WLAN and the WLAN AP.

Optionally, the method could also include a step of configuring the user terminal to provide information regarding the movement of the user terminal between networks. In this regard, one or both of the WLAN and the 3GPP network could be configured to send a frame/message to the user terminal (e.g. during the establishment of an association/connection), the frame/message indicating that the user terminal should provide network identification information should the user terminal attempt to move between networks. For example, when an RRC connection with the 3GPP RAN is established, the 3GPP RAN could send a RRC Connection Reconfiguration message to the user terminal including an indication that the user terminal should notify the 3GPP RAN when the user terminal attempts to move between RANs. The 3GPP RAN would thereby instruct/configure the user terminal to send a notification when the user terminal is attempting to move to the 3GPP network from another network, the notification including information about the source/origin network (e.g. identifying a WLAN and a WLAN AP). Then, as the user terminal is currently associated with a WLAN, the user terminal will send an RRC message to the 3GPP RAN including information identifying the WLAN and the WLAN AP.

In addition, the step of sending information identifying the 3GPP network and the 3GPP cell to the WLAN can optionally comprise generating a disassociation frame that includes information identifying the 3GPP network and the 3GPP cell, and sending the disassociation frame to the WLAN. As an alternative example, the information identifying the 3GPP network and the 3GPP cell could be sent to the WLAN in a new frame/message. In particular, the user terminal could generate a disassociation frame that includes an indication that a further frame is to be sent, and could send the disassociation frame to the WLAN. The user terminal could then generate a further frame that includes information identifying the 3GPP network and the 3GPP cell, and send this further frame to the WLAN. The inclusion of an indication in the disassociation frame ensures that the identification information sent in the further frame is associated/correlated with the earlier association between the user terminal and the WLAN. Alternatively, the WLAN protocol could be revised so as to provide for such a new frame/message, such that the protocol version would indicate that a further frame is to be sent. In this case, either before or after sending a disassociation frame to the WLAN, the user terminal could generate a further frame that includes information identifying the 3GPP network and the 3GPP cell, and send the further frame to the WLAN.

FIG. 4 illustrates schematically an embodiment of a user terminal 10 configured to implement the methods described above. The user terminal 10 can be implemented as a combination of computer hardware and software and comprises a receiver 11, a transmitter 12, a processor 13, and a memory 14. The memory 14 stores the various programs/executable files that are implemented by the processor 13, and also provides a storage unit for any required data. For example, the memory can store any identification information received from a 3GPP network or WLAN. The programs/executable files stored in the memory 14, and implemented by the processor 13, are configured to implement the methods described above. In this regard, these programs/executable files can include but are not limited to an access network detection unit, an access network selection unit, an access network identification unit, and a message generation unit.

FIG. 5 illustrates schematically an embodiment of an entity of a WLAN 20 configured to implement the methods described above. The WLAN entity 20 can be implemented as a combination of computer hardware and software and comprises a receiver 21, a transmitter 22, a processor 23, and a memory 24. The memory 24 stores the various programs/executable files that are implemented by the processor 23, and also provides a storage unit for any required data. For example, the memory 24 can store any 3GPP network and 3GPP cell identification information received from a user terminal, and any information regarding an attempt by the user terminal to move between the WLAN and the 3GPP network (i.e. user terminal mobility tracking information). The programs/executable files stored in the memory 24, and implemented by the processor 23, are configured to implement the methods described above. In this regard, these programs/executable files can include but are not limited to an authentication unit, an association unit, a user terminal mobility tracking unit, and a message generation unit.

FIG. 6 illustrates schematically an embodiment of an entity of a 3GPP network 30 configured to implement the methods described above. The 3GPP network entity 30 can be implemented as a combination of computer hardware and software and comprises a receiver 31, a transmitter 32, a processor 33, and a memory 34. The memory 34 stores the various programs/executable files that are implemented by the processor 33, and also provides a storage unit for any required data. For example, the memory 34 can store any WLAN and WLAN AP identification information received from a user terminal, and any information regarding an attempt by the user terminal to move between the 3GPP network and the WLAN (i.e. user terminal mobility tracking information). The programs/executable files stored in the memory 34, and implemented by the processor 33, are configured to implement the methods described above. In this regard, these programs/executable files can include but are not limited to an attachment unit, a user terminal mobility tracking unit, and a message generation unit.

Although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. For example, in the illustrated example signalling flow diagrams described above, only those messages and headers that are of particular relevance are shown. Those skilled in the art will be aware those messages and headers that have not been included in this illustration. In addition, whilst the above described embodiments specifically relate to heterogeneous networks comprised of at least a 3GPP network and a Wi-Fi RAN, the principles of the methods described herein are equally applicable to heterogeneous networks that comprise other radio access technologies; such as cdmaOne and CDMA2000.

The invention claimed is:

1. A method of operating a user terminal, the method comprising:

when the user terminal is attempting to move from a cell of a 3GPP network to an access point (AP) of a wireless local area network (WLAN), sending identification information identifying the 3GPP network and the cell of the 3GPP network to the WLAN, wherein the identification information identifying the 3GPP network and the cell of the 3GPP network is received by an entity of the WLAN, wherein the entity of the WLAN stores the information identifying the 3GPP network and the cell of the 3GPP network together with information regarding association, of the user terminal, with the WLAN, wherein the information regarding the association with the WLAN comprises time of an attempt of the association with the WLAN, an indication of success or failure of the attempt of the association with the WLAN, an identity of the user terminal, and an identity of a user of the user terminal, and wherein the identification information, identifying the 3GPP network and the cell of the 3GPP network, comprises a Cell Global Identity (CGI) of the cell of the 3GPP network, the CGI of the cell of the 3GPP network comprising a Mobile Country Code (MCC), a Mobile Network Node (MNC), a Location Area Code (LAC), and a Cell Identity (CI); and when the user terminal is attempting to move from the AP of the WLAN to the cell of the 3GPP network, sending identification information identifying the WLAN and the AP of the WLAN to the 3GPP network, wherein sending the identification information identifying the 3GPP network and the cell of the 3GPP network to the WLAN comprises:

generating an association request frame that includes an indication that a further frame is to be sent, sending the association request frame to the WLAN, generating the further frame that includes information identifying the 3GPP network and the cell of the 3GPP network, and sending, after sending the association request frame to the WLAN, the further frame to the WLAN.

2. The method of claim 1, wherein when the user terminal is attempting to move from the cell of the 3GPP network to the AP of the WLAN, the method further comprises:

when attempting to associate with the WLAN, sending the identification information identifying the 3GPP network and the cell of the 3GPP network to the WLAN, and obtaining the identification information identifying the WLAN and the AP of the WLAN; and when disconnecting from the cell of the 3GPP network, sending the obtained identification information identifying the WLAN and the AP of the WLAN to the 3GPP network.

3. The method of claim 2, further comprising any one of:

receiving a message from the 3GPP network, the message from the 3GPP network indicating that when the user terminal is attempting to move to or from a further network, the user terminal is to provide identification information identifying the further network to the 3GPP network; and receiving a message from the WLAN, the message from the WLAN indicating that when the user terminal is attempting to move to or from a further network, the user terminal is to provide identification information identifying the further network to the WLAN.

4. The method of claim 1, wherein when the user terminal is attempting to move from the AP of the WLAN to the cell of the 3GPP network, the method further comprises:

when attempting to attach to the 3GPP network, sending the identification information identifying the WLAN and the AP of the WLAN to the 3GPP network, and obtaining the identification information identifying the 3GPP network and the cell of the 3GPP network; and when disconnecting from the WLAN, sending the obtained identification information identifying the 3GPP network and the cell of the 3GPP network to the WLAN.

5. The method of claim 4, further comprising any one of:

receiving a message from the WLAN, the message from the WLAN indicating that when the user terminal is attempting to move to or from a further network, the user terminal is to provide identification information identifying the further network to the WLAN; and receiving a message from the 3GPP network, the message from the 3GPP network indicating that when the user terminal is attempting to move to or from a further network, the user terminal is to provide identification information identifying the further network to the 3GPP network.

6. The method of claim 1, wherein the identification information identifying the 3GPP network and the cell of the 3GPP network, comprises a Routing Area Identification and a cell identity.

7. The method of claim 1, wherein the identification information, identifying the WLAN, comprises a Service Set Identifier.

8. The method of claim 7, wherein the identification information, identifying the WLAN, further comprises a Homogeneous Extended Service Set Identifier.

9. The method of claim 1, wherein the identification information, identifying the AP of the WLAN, comprises a Basic Service Set Identifier.

10. The method of claim 1, wherein the Mobile Country Code (MCC) identifies a country in which a Global System for Mobile Communications (GSM) Public Land Mobile Network (PLMN) is located, the Mobile Network Node (MNC) is a code that identifies the GSM PLMN within the country, the Location Area Code (LAC) identifies a location area within the GSM PLMN, and the Cell Identity (CI) identifies a cell within the location area.

11. A method of operating an entity of a Wireless Local Area Network (WLAN), the method comprising:

during an attempt by a user terminal to associate with the WLAN, receiving identification information identifying a 3GPP network and a cell of the 3GPP network to which the user terminal is currently attached, and causing storage of the identification information identifying the 3GPP network and the cell of the 3GPP network in the WLAN together with information regarding the association, wherein the information regarding the association with the WLAN comprises time of an attempt of the association, an indication of success or failure of the attempt of the association, an identity of the user terminal, and an identity of a user of the user terminal, and wherein the identification information, identifying the 3GPP network and the cell of the 3GPP network, comprises a Cell Global Identity (CGI) of the cell of the 3GPP network, the CGI of the cell of the 3GPP network comprising a Mobile Country Code (MCC), a Mobile Network Node (MNC), a Location Area Code (LAC), and a Cell Identity (CI); and during disassociation of the user terminal from the WLAN, receiving the identification information identifying the 3GPP network and the cell of the 3GPP network to which the user terminal has attached, and causing storage of the identification information identifying the 3GPP network and the cell of the 3GPP network in the WLAN together with information regarding the disassociation with the WLAN, wherein the information regarding the disassociation with the WLAN comprises time of the disassociation with the WLAN, an identity of the user terminal, and an identity of a user of the user terminal, and wherein receiving the identification information identifying the 3GPP network and the cell of the 3GPP network to which the user terminal is currently attached comprises:

receiving an association request frame from the 3GPP network, the association request frame including an indication that a further frame is to be sent, and receiving, after the reception of the association request frame from the 3GPP network, the further frame including the information identifying the 3GPP network and the cell of the 3GPP network.

12. The method of claim 11, further comprising:

sending a message to the user terminal, the message indicating that when the user terminal is attempting to move to or from a further network, the user terminal is to provide identification information identifying the further network to the WLAN.

13. The method of claim 11, wherein the Mobile Country Code (MCC) identifies a country in which a Global System for Mobile Communications (GSM) Public Land Mobile Network (PLMN) is located, the Mobile Network Node (MNC) is a code that identifies the GSM PLMN within the country, the Location Area Code (LAC) identifies a location area within the GSM PLMN, and the Cell Identity (CI) identifies a cell within the location area.

* * * * *